United States Patent [19]

Brown et al.

[11] Patent Number: 4,586,578
[45] Date of Patent: May 6, 1986

[54] ARTICULATED VEHICLE

[75] Inventors: David P. Brown, Castle Eden; John B. Brown, Durham County, both of England

[73] Assignee: Muiltidrive Limited, Peterlee, England

[21] Appl. No.: 542,999

[22] Filed: Oct. 18, 1983

[30] Foreign Application Priority Data

Dec. 21, 1982 [GB] United Kingdom ................ 8236327

[51] Int. Cl.$^4$ ............................................. B62D 59/04
[52] U.S. Cl. .................................... 180/14.4; 280/426; 280/442
[58] Field of Search ............... 280/426, 419, 100, 443, 280/442; 180/14.3, 14.4, 235

[56] References Cited

U.S. PATENT DOCUMENTS

| 1,528,916 | 3/1925 | Edwards | 180/14.4 |
| 2,078,756 | 4/1937 | Harris | 280/442 |
| 3,156,487 | 11/1964 | Bigge | 280/426 |
| 3,294,189 | 12/1966 | Rear | 180/14.4 |
| 3,712,641 | 1/1973 | Sherman | 280/442 |
| 4,042,053 | 8/1977 | Sieren | 180/235 |
| 4,451,058 | 5/1984 | Curry | 280/443 |

FOREIGN PATENT DOCUMENTS 527867 8/1955 Italy ................................ 180/14.4

Primary Examiner—John J. Love
Assistant Examiner—Everett G. Diederiks, Jr.
Attorney, Agent, or Firm—Holman & Stern

[57] ABSTRACT

A trailing unit is pivotally supported by a tractor or leading unit at the front and a sub-chassis at the rear. Pivoting of the sub-chassis is controlled in accordance with turning of the leading unit so that the angle between sub-chassis and trailing unit is equal and opposite to the angle between leading unit and trailing unit. Power is communicated between leading unit and sub-chassis by a front shaft on the leading unit, a rear shaft on the sub-chassis, and an intermediate shaft connected to them by universal joints at positions equidistant from the pivot axes of the leading unit and sub-chassis.

4 Claims, 5 Drawing Figures

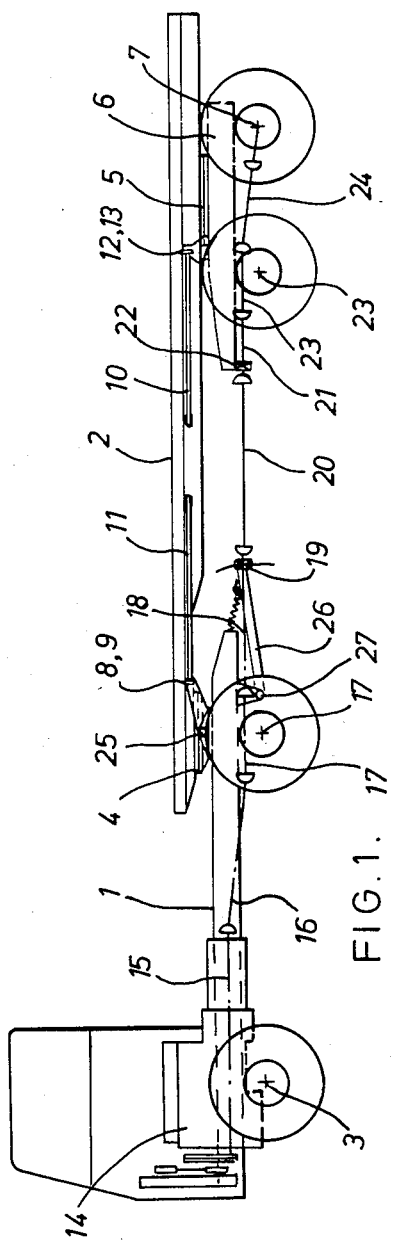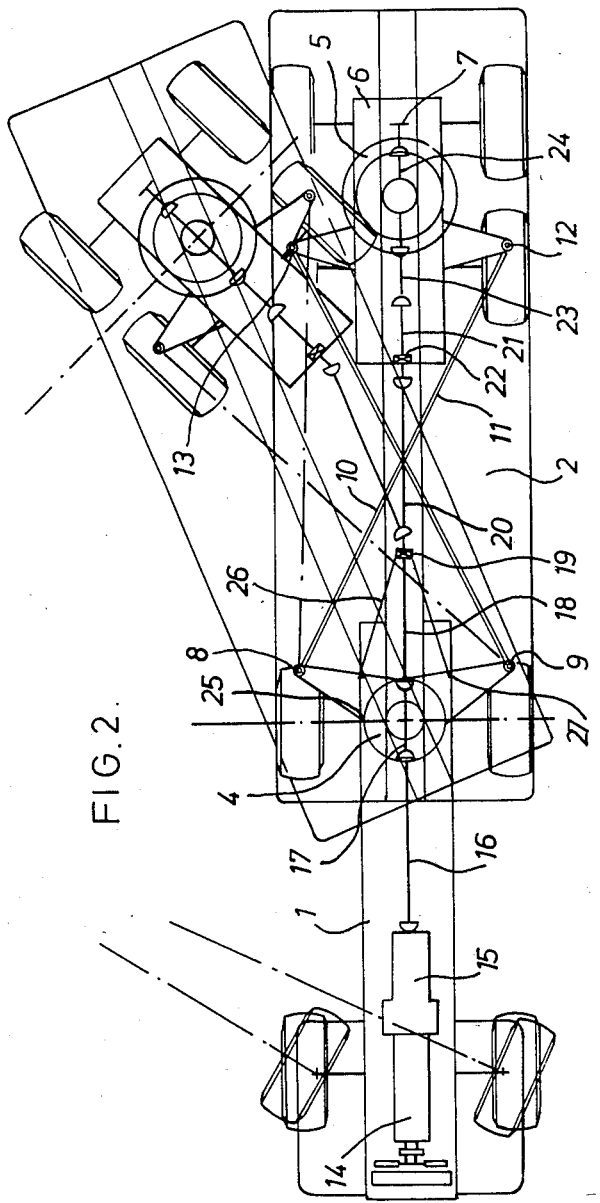

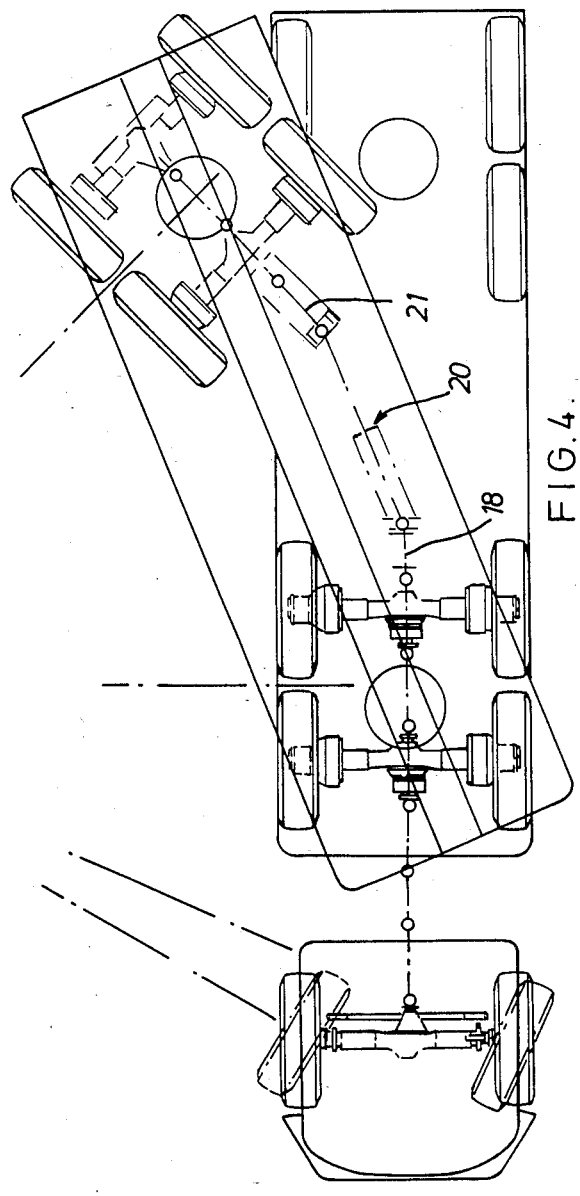
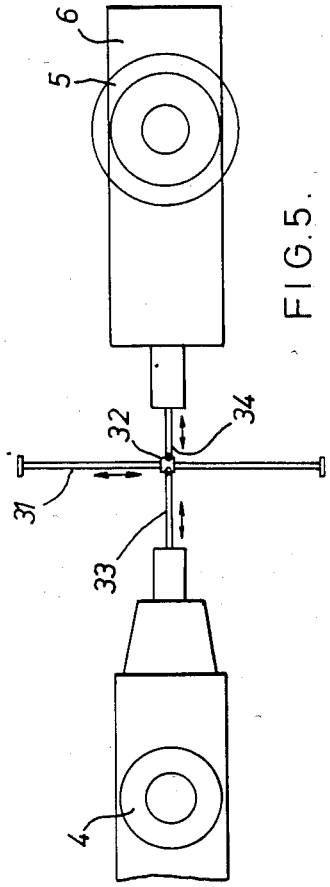
FIG.4.
FIG.5.

ARTICULATED VEHICLE

BACKGROUND OF THE INVENTION

1. Field of the Invention

This invention relates to an articulated vehicle comprising a trailing unit which is pivotally supported at the front by a leading unit.

2. Description of the Prior Art

The trailing unit, part of whose weight is carried by the leading unit, is usually referred to as the semi-trailer and may in turn be connected to a full trailer, i.e. a trailer having front and rear axles. In the normal situation in which the leading unit houses the engine and is the only driving unit, it is referred to as the tractor. However, it will be appreciated that there may be circumstances in which it is preferable for the engine to be carried by the trailing unit.

The articulated highway truck is recognized as the most economical vehicle for the movement of goods on paved highways. For on/off highway use rigid frame vehicles are considered essential at present, owing to the higher percentage of gross weight imposed on the drive axles which in turn provides better traction to overcome the combination of high rolling resistance coupled with lower wheel adhesion factors.

Thus the vehicle which is the most economical (owing to its high legal and practicable payload) is precluded from a very substantial sector of the commercial and military vehicle market because of its inherently low tractive capability on poor surfaces. It is known that articulated vehicles are being marketed with hydrostatic drive to the trailer axles but these have a low performance due to the difficulty of matching the speeds of the direct mechanically driven front axles to those of the hydrostatically driven trailer axles.

It would therefore be desirable to be able to provide a method of driving the axle or axles of an articulated truck's semi-trailer at the same speed as the drive axle or axles of the tractor regardless of steering lock angle between the tractor and semi-trailer.

A problem with articulated vehicles is that, during turning, the trailing unit cuts in on the leading unit, i.e. the inside turning radius is considerably smaller than the outside turning radius, so that a large amount of space is needed to maneuver the vehicle. This problem becomes worse if a full trailer is attached to a semi-trailer. It would therefore also be desirable to prevent cutting-in by the trailing unit.

BRIEF SUMMARY OF THE INVENTION

The present invention provides an articulated vehicle comprising a leading unit and a trailing unit which is pivotally supported by the leading unit at the front and by a sub-chassis at the rear, the vehicle having control means for controlling pivoting of the sub-chassis in accordance with turning of the leading unit in such a manner that the angle between the respective centerlines of the sub-chassis and the trailing unit is equal and opposite to the angle between the respective centerlines of the leading unit and the trailing unit, and a mechanism for communicating power between the leading unit and the sub-chassis, the mechanism comprising a front shaft mounted on the leading unit, a rear shaft mounted on the sub-chassis, and an intermediate shaft connected to the front and rear shafts by respective universal joints at respective positions that are equidistant from the respective pivot axes of the leading unit and the sub-chassis.

The pivoting of the sub-chassis by the control means counteracts the tendency of the trailing unit to cut in on the leading unit during turning. In other words, the inside turning radius is increased in relation to the outside radius, thereby reducing aisle width requirements, i.e. the space needed to maneuver. A further advantage is that a full trailer attached to the rear of the trailing unit does not cut in on the rear of the leading unit but only on the rear of the trailing unit. Thus an articulated vehicle according to the invention towing a full trailer will, when turning, cut in only to the extent that a conventional articulated truck would cut in without such a trailer.

Since the above-mentioned angles between the centerlines are maintained equal and opposite by the control means, the above-specified positioning of the universal joints ensures that the angle between the front shaft and the intermediate shaft is always equal and opposite to the angle between the rear shaft and the intermediate shaft, this being a requirement for the trouble-free functioning of such a shaft arrangement.

Any convenient control means may be used for controlling the pivoting of the sub-chassis in relation to the pivoting of the leading unit, whether mechanical means, hydraulic means, electrical means, or a combination of means.

BRIEF DESCRIPTION OF THE DRAWINGS

The invention will be described further, by way of example, with reference to the accompanying drawings, wherein:

FIG. 1 is a schematic side elevational view of an articulated vehicle in accordance with the invention;

FIG. 2 is a schematic bottom plan view of the vehicle of FIG. 1, shown both driving straight-ahead and turning;

FIG. 4 is a more detailed schematic bottom plan view of the vehicle of FIG. 3, shown both driving straight-ahead and turning; and FIG. 5 is a schematic detail of another articulated vehicle, showing an alternative form of control means for controlling pivoting of a sub-chassis.

DETAILED DESCRIPTION

Figure 3:
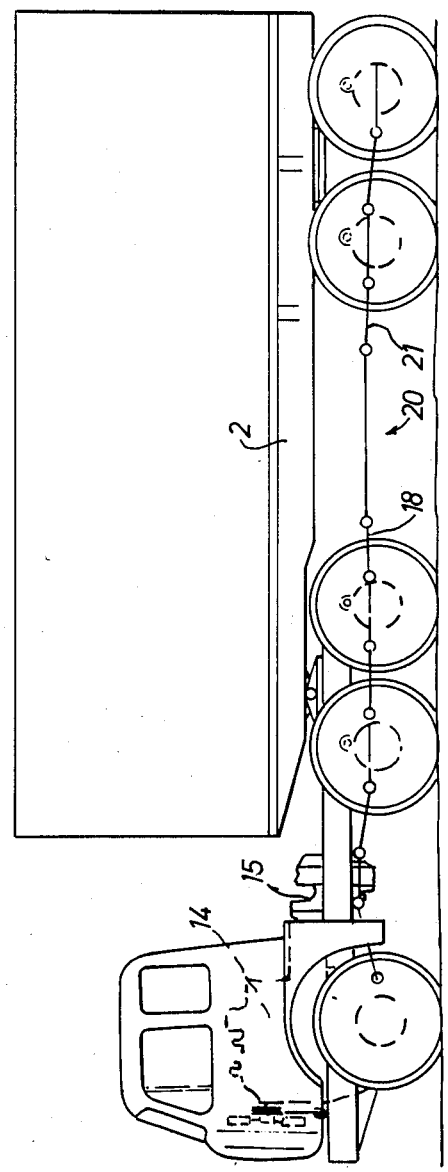
FIG. 3 is a more detailed schematic elevational side view of a similar articulated vehicle.

The articulated vehicle illustrated in FIGS. 1 and 2 comprises a standard or special highway tractor 1 which could have 2, 3, 4 or more axles, all or some of which may be driven. In the present case, there are two axles, only the rear one being driven. A trailer 2 with 1, 2, 3 or more axles, one or more of which may be driven, can rotate about a so-called 5th wheel coupling or turntable 4 mounted on the tractor 1; in the present case, there are two axles, both of which are driven. Attached to the rear of the trailer 2 is a turntable 5 whose lower section is attached to a sub-chassis 6 carrying the trailer axles 7, 23. As the tractor 1 steers to left or right of the trailer 2 via its front steering axles 3 the centerline of the trailer sub-chassis 6 is rotated to an equal and opposite angle in relation to the trailer 2 by suitable control means. This co-ordinated movement can be achieved mechanically (as illustrated) or hydraulically or electrically or by a combination of such means, for example.

In the control means illustrated in FIGS. 1 and 2, the lower section of the front turntable 4 has arms extended on either side of the tractor centerline and to pivots 8 and 9 on the ends of the arms connected to tension, or steering, rods 10 and 11 at one end, and the other end of each rod is connected to pivots 12 and 13 attached to the trailer sub-chassis 6 on arms extended on either side of the centerline thereof. All the pivots 8 and 9, 12 and 13 have the same radius from the adjacent turntables 4, 5 and when the longitudinal centerline of the trailer is aligned with the longitudinal centerline of the tractor, lines drawn at right angles to the rods 10 and 11 which pass through the pivots 8 and 9, 12 and 13 will pass through the center of the adjacent turntable.

The engine 14 and transmission 15 are connected to both the tractor drive axle and the trailer drive axle. The driven axle groups travel in substantially the same track owing to the control means, and Cardan shafts are arranged so as to impart constant velocity into the trailer axles at any degree of turn, as follows.

A Cardan shaft 16 connects the transmission 15 to a "through drive" axle 17 which can be fitted with an interaxle differential. From the rear of the axle 17 a front Cardan shaft 18 supported by a bearing 19 is connected to an intermediate Cardan shaft 20 which has its Hookes joints equidistant from the center of the tractor and trailer turntables 4 and 5. The rear of intermediate Cardan shaft 20 is joined to a rear Cardan shaft 21 which is supported at one end by a bearing 22 and which drives into a "through drive" axle 23 which may also be fitted with an interaxle differential.

A Cardan shaft 24 drives from the axle 23 to the rear axle 7. As there is no vertical movement of the sub-chassis 6 in relation to the trailer 2, the bearing 22 is rigidly mounted on the sub-chassis 6. As the tractor 1 can vertically rotate (about 15°) in relation to the trailer 2 about a pivot 25, it is necessary that the bearing 19 be able to move up and down whilst remaining on the centerline of the tractor. This movement is accommodated by mounting the bearing 19 at the end of an A-frame 26 which is pivoted about pivots 27 mounted on the tractor chassis.

All the Cardan shafts have slip joints to accommodate the vertical movement of the axles in relation of their respective chassis, and in the case of the intermediate Cardan shaft 20 to enable it to lengthen during steering from the central to the maximum steering angle.

If the tractor is fitted with tandem drive axles then a special transfer gear box can transmit the drive equally to the tractor and trailer axles.

It may be desirable to boost the mechanical steering control means hydraulically or electrically to reduce the stress in the rods 10 and 11 and at the same time reduce the steering forces which need to be imposed by the front tires.

The vehicle illustrated in FIGS. 3 and 4 is essentially similar to that shown in FIGS. 1 and 2, except that the tractor 1 has three axles, all of which are driven. The mechanical steering control means, which is the same as that described above with reference to FIGS. 1 and 2, has been omitted from FIGS. 3 and 4 for the sake of clarity.

FIG. 5 illustrates an alternative mechanical steering control means, in which a transverse bar 31 fixed to the underside of the trailer 2 carries a sliding bearing 32 which is pivotally connected to two telescopic rods 33 and 34 mounted parallel to the centerlines of the tractor 1 and the sub-chassis 6 respectively. The bar 31 is midway between the pivot axes of the turntables 4 and 5.

We claim:

1. An articulated vehicle comprising:
    a leading unit having a longitudinal centerline;
    a trailing unit having a longitudinal centerline;
    means to pivotally support the front end of said trailing unit on said leading unit for pivotal movement about a front pivot axis;
    a sub-chassis having a longitudinal centerline at the rear of said trailing unit;
    means to pivotally support the rear of said trailing unit on said sub-chassis for pivotal movement about a rear pivot axis;
    control means operatively connected between said leading unit and said sub-chassis to control the pivotal movement of said sub-chassis by the turning of the leading unit so that the angle between the respective longitudinal centerlines of said sub-chassis and trailing unit is equal and opposite to the angle between the respective longitudinal centerlines of said leading and trailing units;
    an engine mounted on the leading unit;
    a mechanism for communicating power between said engine and said sub-chassis comprising,
        a front shaft mounted on said leading unit parallel to the longitudinal centerline thereof and operatively connected to said engine,
        a rear shaft mounted on said sub-chassis parallel to the longitudinal centerline thereof,
        an intermediate shaft between said front and rear shafts,
        respective universal joints operatively connecting said intermediate shaft to said front and rear shafts so that said intermediate shaft is driven by said front shaft and drives said rear shaft, said universal joints being substantially equidistantly spaced from said front and rear pivot axes, the universal joint connecting said intermediate shaft to said front shaft having a central axis extending parallel to the longitudinal centerline of said leading unit, the universal joint connecting said intermediate shaft to said rear shaft having a central axis extending parallel to the longitudinal centerline of said sub-chassis, and
        means to vary the length of said intermediate shaft during relative pivotal movement between said leading and trailing units;
    a frame member pivotally mounted on said leading unit for pivotal movement about an axis transverse to a plane containing the longitudinal centerline of said leading unit and said front pivot axis; and
    a bearing mounted on said frame member operatively supporting said front shaft so that said front shaft is pivotable about an axis parallel to said transverse axis.

2. The vehicle as claimed in claim 1 wherein said control means comprises:
    two elongated steering rods disposed in crossing relationship with respect to each other and having respective front and rear ends on opposite sides of the central longitudinal axis of the trailing unit; and
    means to pivotally connect said front ends of said rods to said leading unit and said rear ends of said rods to said sub-chassis.

3. The vehicle as claimed in claim 2 wherein said control means further comprises:
    forward arms on said leading unit extending on opposite sides of the longitudinal centerline of said leading unit;

rear arms on said sub-chassis extending on opposite sides of the longitudinal centerline of said sub-chassis;

and wherein said steering rods are straight, and said means to pivotally connect the ends of said steering rods to said leading unit and sub-chassis comprises pivotal connecting means mounted on said arms operatively connected to respective ends of said rods, so that the pivot axes of said pivotal connecting means all have the same radius from the adjacent front and rear pivot axes and when the longitudinal centerlines of said leading and trailing units are aligned, straight lines at right angles to said rods passing through said pivot axes of said pivotal connecting means pass through the respective adjacent front and rear pivot axes.

4. The vehicle as claimed in claim 3 wherein said control means comprises:
- a transverse guide member mounted on said trailing unit and having a longitudinal centerline extending transversely to and on opposite sides of the longitudinal centerline of said trailing unit midway between said front and rear pivot axes;
- a sliding bearing operatively mounted on said transverse guide member for sliding movement therealong;
- a front telescoping rod member operatively mounted on the leading unit parallel to the longitudinal central axis thereof;
- a rear telescoping rod member operatively mounted on said sub-chassis parallel to the longitudinal centerline thereof; and
- means to pivotally connect said telescoping rod members to said sliding bearing.

* * * * *